US009889322B2

(12) United States Patent
Casebolt

(10) Patent No.: US 9,889,322 B2
(45) Date of Patent: *Feb. 13, 2018

(54) CENTRIFUGAL BRAKE ASSEMBLY

(71) Applicant: D B Industries, LLC, Red Wing, MN (US)

(72) Inventor: Scott C. Casebolt, St. Paul Park, MN (US)

(73) Assignee: D B Industries, LLC, Red Wing, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/342,812

(22) Filed: Nov. 3, 2016

(65) Prior Publication Data
US 2017/0050061 A1    Feb. 23, 2017

Related U.S. Application Data

(60) Continuation of application No. 14/801,463, filed on Jul. 16, 2015, now Pat. No. 9,488,235, which is a
(Continued)

(51) Int. Cl.
*A62B 35/00*    (2006.01)
*A62B 1/10*    (2006.01)
*F16D 59/00*    (2006.01)

(52) U.S. Cl.
CPC ............ *A62B 35/0093* (2013.01); *A62B 1/10* (2013.01); *F16D 59/00* (2013.01)

(58) Field of Classification Search
CPC .................................................. A62B 35/0093
See application file for complete search history.

(56) References Cited

U.S. PATENT DOCUMENTS 157,660 A    12/1874    Weston
523,874 A    7/1894    Weston
(Continued)

FOREIGN PATENT DOCUMENTS

CH    364180    9/1958
DE    177841    3/1905
(Continued)

OTHER PUBLICATIONS

"Aptura™ LT30 Self-Retracting Lanyard", http://msafallprotection.com/product16592.html, MSA The Safety Company, 2 pages (Known of prior to filing of U.S. Appl. No. 12/751,386. Printed Sep. 17, 2010) (© MSA 2010).
(Continued)

*Primary Examiner* — Alvin Chin-Shue
(74) *Attorney, Agent, or Firm* — Dicke, Billig & Czaja, PLLC

(57) ABSTRACT

A centrifugal brake assembly comprises at least one pawl, at least one biasing member, and a rotor. The at least one pawl includes a base from which a circular portion and a triangular protrusion extend to form a notch. The rotor includes at least one receiving portion having a notched portion to receive the circular portion. One of the at least one pawl and the rotor has a slotted portion, and the at least one biasing member is seated within the slotted portion. Another of the at least one pawl and the rotor has a protrusion at least partially extending within the slotted portion. The notch engages a stop member and the base contacts the rotor when the at least one pawl is in an engaged position to reinforce engagement of the stop member by the at least one pawl.

12 Claims, 3 Drawing Sheets

Related U.S. Application Data continuation of application No. 14/254,592, filed on Apr. 16, 2014, now Pat. No. 9,151,349, which is a division of application No. 13/660,262, filed on Oct. 25, 2012, now Pat. No. 9,121,462.

(60) Provisional application No. 61/552,530, filed on Oct. 28, 2011.

(56) References Cited

U.S. PATENT DOCUMENTS

| | | | |
|---|---|---|---|
| 659,093 | A | 10/1900 | Ockers |
| 1,363,749 | A | 12/1920 | Peterson |
| 1,724,713 | A | 8/1929 | Johnston |
| 1,950,289 | A | 3/1934 | Benson |
| 2,268,243 | A | 12/1941 | Curtis |
| 2,502,896 | A | 4/1950 | Sherbrook et al. |
| 2,776,815 | A | 1/1957 | Sheard |
| 2,809,804 | A | 10/1957 | Sheard |
| 3,081,839 | A | 3/1963 | O'Brien |
| 3,089,599 | A | 5/1963 | Casella |
| 3,101,927 | A | 8/1963 | Gray |
| 3,204,720 | A | 9/1965 | Eitel |
| 3,879,016 | A | 4/1975 | Kankkunen |
| 3,946,989 | A | 3/1976 | Tsuda |
| 3,999,627 | A | 12/1976 | Naka |
| 4,125,142 | A | 11/1978 | Fohl |
| 4,177,962 | A | 12/1979 | Hildebrandt |
| 4,421,209 | A | 12/1983 | Vermette et al. |
| 4,434,869 | A | 3/1984 | Roop et al. |
| 4,476,956 | A | 10/1984 | Eger |
| 4,577,725 | A | 3/1986 | Hunter |
| 4,589,519 | A | 5/1986 | Hunter |
| 4,589,523 | A | 5/1986 | Olson et al. |
| 4,598,792 | A | 7/1986 | Lew et al. |
| 4,598,793 | A | 7/1986 | Lew et al. |
| 4,679,656 | A | 7/1987 | Lew et al. |
| 4,688,657 | A | 8/1987 | Erickson |
| 4,694,934 | A | 9/1987 | Erickson |
| 4,702,348 | A | 10/1987 | Lew et al. |
| 4,737,065 | A | 4/1988 | Ju |
| 4,793,436 | A | 12/1988 | Lew et al. |
| 4,830,340 | A | 5/1989 | Knitig |
| 4,877,110 | A | 10/1989 | Wolner |
| 5,070,978 | A | 12/1991 | Pires |
| 5,186,289 | A | 2/1993 | Wolner et al. |
| 5,287,950 | A | 2/1994 | Feathers et al. |
| 5,305,852 | A | 4/1994 | Klokseth |
| 5,722,612 | A | 3/1998 | Feathers |
| 5,738,293 | A * | 4/1998 | Fohl ............... B60R 22/4676 242/374 |
| 5,762,282 | A | 6/1998 | Wolner |
| 5,878,855 | A | 3/1999 | Miyata |
| 5,927,438 | A | 7/1999 | Ostrobrod |
| 6,019,304 | A | 2/2000 | Skowronski et al. |
| 6,085,368 | A | 7/2000 | Robert et al. |
| 6,182,791 | B1 | 2/2001 | Cope |
| 6,283,398 | B1 | 9/2001 | Specht |
| 6,494,292 | B2 | 12/2002 | Cope |
| 6,523,771 | B2 | 2/2003 | Sumiyashiki |
| 6,550,597 | B2 | 4/2003 | Taniguchi |
| 6,810,997 | B2 | 11/2004 | Schreiber et al. |
| 7,258,324 | B2 | 8/2007 | Gilman |
| 7,281,620 | B2 * | 10/2007 | Wolner ............... A62B 1/10 192/223.1 |
| 7,946,387 | B2 | 5/2011 | Betcher et al. |
| 8,181,744 | B2 | 5/2012 | Parker et al. |
| 8,251,176 | B2 | 8/2012 | Meillet et al. |
| 2002/0179372 | A1 | 12/2002 | Schreiber et al. |
| 2004/0065508 | A1 | 4/2004 | Avots et al. |
| 2005/0039981 | A1 | 2/2005 | Wooster et al. |
| 2005/0051659 | A1 | 3/2005 | Wolner et al. |
| 2006/0113147 | A1 | 6/2006 | Harris, Jr. |
| 2007/0151805 | A1 | 7/2007 | Betcher et al. |
| 2007/0215410 | A1 | 9/2007 | Ecker |
| 2007/0261921 | A1 | 11/2007 | Gal et al. |
| 2008/0035423 | A1 | 2/2008 | Meillet et al. |
| 2008/0128221 | A1 | 6/2008 | Rogge |
| 2008/0203210 | A1 * | 8/2008 | Nagata ............... B60R 22/4676 242/396.1 |
| 2009/0017887 | A1 | 1/2009 | Montocchio |
| 2009/0084883 | A1 | 4/2009 | Casebolt et al. |
| 2009/0211848 | A1 | 8/2009 | Parker et al. |
| 2010/0224448 | A1 | 9/2010 | Wolner et al. |
| 2010/0226748 | A1 | 9/2010 | Wolner et al. |

FOREIGN PATENT DOCUMENTS

| | | |
|---|---|---|
| DE | 29 19 216 A1 | 11/1980 |
| DE | 198 18 688 C1 | 1/2000 |
| DE | 201 08 777 U1 | 8/2001 |
| DE | 203 06 119 U1 | 6/2003 |
| DE | 102 10 969 A1 | 10/2003 |
| DE | 20 2006 020 127 U1 | 11/2007 |
| DE | 20 2007 013 135 U1 | 4/2008 |
| EP | 0 247 818 A2 | 12/1987 |
| FR | 1.208.895 A | 2/1960 |
| FR | 2654940 A1 | 5/1991 |
| GB | 238302 | 8/1925 |
| GB | 999553 A | 7/1965 |
| GB | 2 256 413 A | 12/1992 |
| GB | 2 279 636 A | 1/1995 |
| GB | 2 306 107 A | 4/1997 |
| WO | WO 97/12786 | 4/1997 |
| WO | 200054842 | 9/2000 |
| WO | WO 2006/094486 A1 | 9/2006 |
| WO | WO 2008/008225 A2 | 1/2008 |
| WO | WO2009/047470 A1 | 4/2009 |
| WO | WO 2009/108646 A2 | 9/2009 |

OTHER PUBLICATIONS

"Aptura™ LT30 Self-Retracting Lanyard [Advanced Performance Technology]", ID 2300-69/Apr. 2004, MSA (FP), 4 pages (© MSA 2004).

"Instructions for Field Line Replacement on the Aptura™ LT12 SRL", Bulletin 2301-30, MSA (FP), 1 page. (© MSA 2003).

"Aptura™ LT30 Self-Retracting Lanyard (SRL) Features & Benefits", 2301-54, MSA (FP), 1 page (© MSA 2004).

"ANSI Z359-Compliant Products from MSA", ID 2302-29-MC/Dec. 2008, MSA The Safety Company, 12 pages (© MSA 2008).

"Aptura™ LT12 Self Retracting Lanyard User Instructions for Field Line Replacement", P/N 10044813, MSA (FP), 8 pages (© 2003 MSA).

"Aptura™ LT12 Self Retracting Lanyard [Advanced Performance Technology]", ID 2300-51, Rev. A/Feb. 2003, MSA (FP), 4 pages (© 2003 MSA).

Fall Arrest Block UB157, ISC (International Safety Components Ltd.), Bangor, Gwynedd, United Kingdom, 4 pages (Printed Sep. 14, 2007).

Fallstop® Safety, Bornack, pp. 55-64 (© Bornack 2007).

Fiche technique, Tractel Group, 3 pages (© Tractel S.A.S. 2003).

MSA Rose Dyna-Lock Self Retracting Lanyards, 2 pages (Printed Jan. 16, 2013. Known of prior to filing of U.S. Appl. No. 13/660,262).

MSA Rose User Instructions Dyna-Lock® Self-Retracting Lanyard, © 1994-2000 Rose Manufacturing Company, PN 622617, Rev. C. 28 pages, Rose Manufacturing Company, Pittsburgh, PA.

Miller TurboLite™ Personal Fall Limiter brochure, Honeywell, 4 pages (known of prior to filing of U.S. Appl. No. 13/660,262).

Miller TurboLite™ Personal Fall Limiter, photographs of product, 2 photographs taken Jan. 2013 (product known of prior to filing of U.S. Appl. No. 13/660,262).

Photographs of fall arrest block device, International Safety Components Ltd., Bangor, Gwynedd, United Kingdom, 11 pages known of prior to filing of U.S. Appl. No. 13/660,262).

Protecta, Instructions for Use AD Series Self Retracting Lifelines, Form 5902290 Rev: F, 2 pages (© Protecta 2005).

(56) References Cited

OTHER PUBLICATIONS

"Retrieval Instructions—To Engage and Disengage the Function Winch—Retractable Type Fall Arrester—AD515, EN360-EN1496 Classe B", Protecta® International, Carros, Codex, France, 4 pages (known of prior to filing of U.S. Appl. No. 13/660,262).
User Instruction Manual Rollgliss® Rescue Emergency Descent Device with Manual Retract, High-Speed, DBI/SALA®, Form 5902152 Rev: A, 12 pages (© 2000 DB Industries, Inc.).
"User Instruction Manual Fisk Descender", DBI SALA®, Form 5902142 Rev: D, 36 pages (© 2002 DB Industries, Inc.).
User Instruction Manual For Rescue/Personnel Riding System Rollgliss R350, DBI/SALA®, Form 5902125 Rev: A, 28 pages (© 2004, DB Industries, Inc.).
"User Instruction Manual—Sealed Self Retracting Lifelines", DBI/SALA®, Form 5902122 Rev: G, 26 pages (© 2004—DB Industries, Inc.).
"User Instruction Manual Rescumatic® Emergency Escape Device and Rescue Cradle", DBI SALA®, Form 5906277 Rev: F, 16 pages (© 2005, DB Industries, Inc.).
"Sealed Self Retracting Lifeline—Revolutionary Sealed Design Stands-Up to Even the Harshest Environments for Ultimate Safety and Reliability!", DBI/SALA®, 2 pages (© 2007—Capital Safety).
"User Instructions Manual Self Retracting Lifelines", DBI SALA®, 38 pages Form: 5902101C Rev: I (© 2007, DB Industries, Inc.).
User Instruction Manual Rollgliss® Rescue Emergency Descent Device with Auto-Retract, DBI SALA®, Form No. 5902105 Rev. B, 16 pages (© 2008, D B Industries, Inc.).
International Search Report for PCT/US2010/054186 dated Mar. 3, 2011.
International Search Report for PCT/US2004/027243 dated Dec. 2, 2004.
International Search Report from PCT/US2012/062153 dated Aug. 2, 2013.
International Preliminary Report on Patentability from PCT/US2012/062153 dated Apr. 29, 2014 (7 pages).
Non-Final Office Action for U.S. Appl. No. 13/660,262 dated May 5, 2014 (13 pages).
Final Office Action for U.S. Appl. No. 13/660,262 dated Oct. 16, 2014 (21 pages).
Advisory Action for U.S. Appl. No. 13/660,262 dated Nov. 28, 2014 (4 pages).
Notice of Allowance for U.S. Appl. No. 13/660,262 dated Jul. 1, 2015 (9 pages).
Non-Final Office Action for U.S. Appl. No. 14/254,592 dated Jun. 26, 2014 (5 pages).
Final Office Action for U.S. Appl. No. 14/254,592 dated Dec. 14, 2014 (9 pages).
Non-Final Office Action for U.S. Appl. No. 14/254,592 dated Mar. 10, 2015 (5 pages).
Notice of Allowance for U.S. Appl. No. 14/254,592 dated Aug. 4, 2015 (13 pages).
Non-Final Office Action for U.S. Appl. No. 14/801,463 dated Dec. 8, 2015 (6 pages).
Final Office Action for U.S. Appl. No. 14/801,463 dated Mar. 23, 2016 (7 pages).
Notice of Allowance for U.S. Appl. No. 14/801,463 dated Jul. 7, 2016 (5 pages).

\* cited by examiner

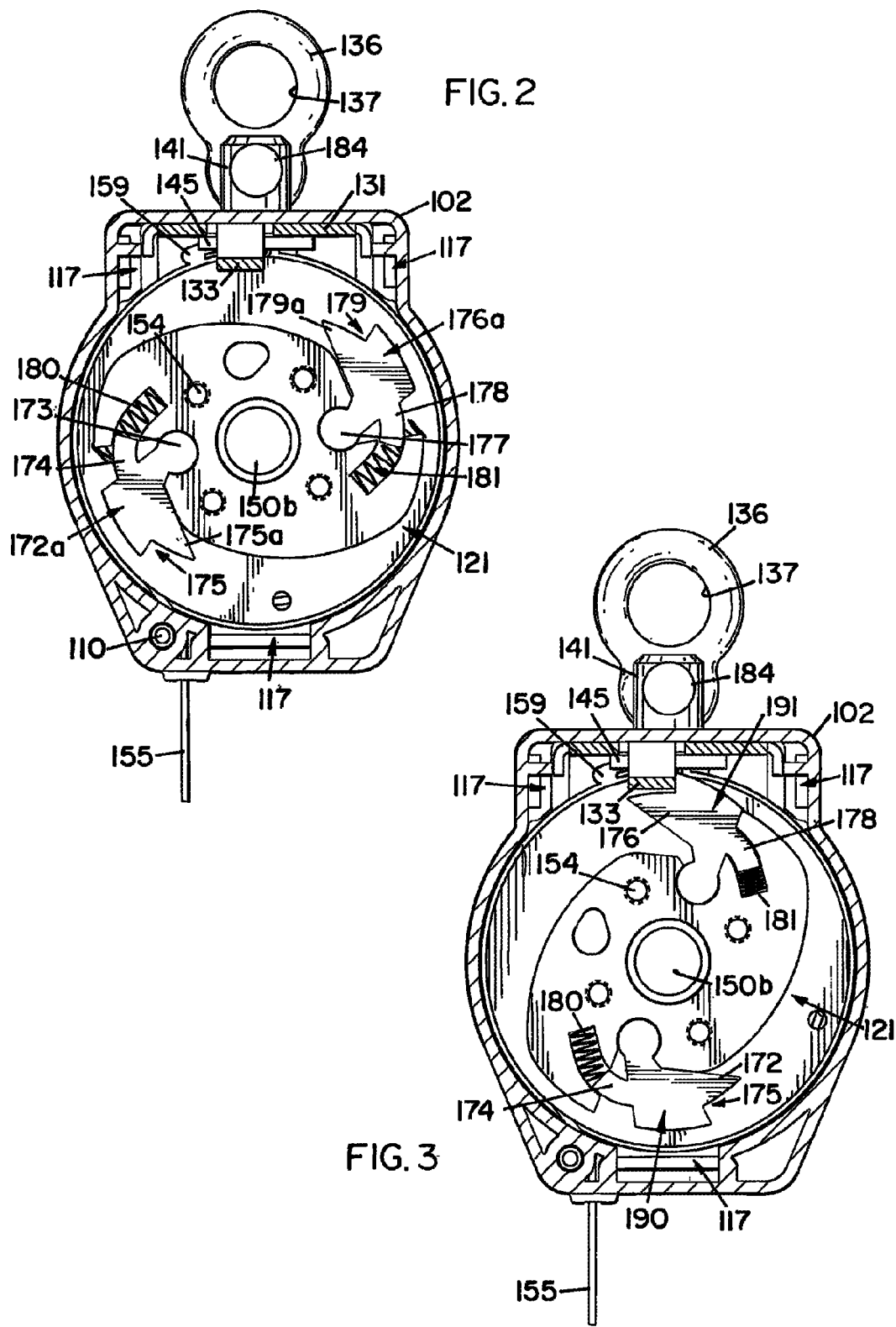

CENTRIFUGAL BRAKE ASSEMBLY

CROSS-REFERENCE TO RELATED APPLICATIONS

This application is a continuation of U.S. application Ser. No. 14/801,463, filed Jul. 16, 2015, which is a continuation of U.S. application Ser. No. 14/254,592, filed Apr. 16, 2014, now U.S. Pat. No. 9,151,349, which is a divisional of U.S. application Ser. No. 13/660,262, filed Oct. 25, 2012, now U.S. Pat. No. 9,121,462, which claims the benefit of U.S. Provisional Application 61/552,530 filed Oct. 28, 2011, which are hereby incorporated by reference.

BACKGROUND OF THE INVENTION

Self-retracting lifelines are well known in the art of fall protection safety equipment for use by workers performing tasks during which there is a risk a fall may occur. Self-retracting lifelines generally include a housing containing a drum around which a lifeline such as a cable, a rope, or webbing is wound. The drum is spring biased to pay out the lifeline as tension pulling the lifeline is applied and to retract any of the lifeline that has been unwound from the drum as the tension on the lifeline is reduced or released. The housing also includes a brake assembly for stopping rotation of the drum when the cable suddenly unwinds from the drum at a rate greater than a predetermined maximum rotational velocity.

A self-retracting lifeline is typically connected to a support structure within the vicinity the worker is performing the task and to a safety harness worn by the worker. Depending upon the type of task being performed, either the housing or the end of the lifeline is connected to the support structure and the other is connected to the safety harness worn by the worker. The lifeline is easily drawn out of the self-retracting lifeline housing as the worker moves away from the device, and the lifeline is automatically drawn back into the housing as the worker moves toward the device. Should a fall occur, a brake member within the device, such as but not limited to a ratchet member or a stop member, is automatically engaged by a centrifugal brake assembly, which stops the worker's fall by stopping the rotation of the drum when the lifeline unwinds from the drum at a rotational velocity greater than a predetermined maximum rotational velocity. As the rotation of the drum is stopped, additional lifeline is prevented from being paid out of the housing to stop the fall of the worker.

It is desired to have a relatively small, lightweight self-retracting lifeline that can be used by itself or with a second self-retracting lifeline.

For the reasons stated above and for other reasons stated below, which will become apparent to those skilled in the art upon reading and understanding the present specification, there is a need in the art for an improved self-retracting lifeline.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a centrifugal brake assembly comprises at least one pawl, at least one biasing member, and a rotor. The at least one pawl includes a base from which a circular portion and a triangular protrusion extend. The base and the triangular protrusion form a notch. The rotor includes at least one receiving portion having a notched portion configured and arranged to receive the circular portion. One of the at least one pawl and the rotor has a slotted portion, and the at least one biasing member is seated within the slotted portion. Another of the at least one pawl and the rotor has a protrusion at least partially extending within the slotted portion. The at least one pawl is pivotable about the circular portion relative to the rotor. The notch of the at least one pawl engages a stop member and the base contacts the rotor when the at least one pawl is in an engaged position to reinforce engagement of the stop member by the at least one pawl.

In one embodiment, a centrifugal brake assembly comprises first and second pawls, first and second biasing members, and a rotor. Each of the first and second pawls includes a base from which a pivoting portion and an engaging portion extend. The rotor includes first and second receiving portions configured and arranged to receive respective pivoting portions. One of the first and second pawls and the rotor has first and second slotted portions, and the first and second biasing members are seated within the respective first and second slotted portions. Another of the first and second pawls and the rotor has first and second elongated protrusions extending in line with the respective first and second slotted portions and first and second biasing members. The first and second biasing members are positioned between respective surfaces forming ends of the first and second slotted portions and the first and second elongated protrusions and place biasing forces on the first and second pawls to position the first and second pawls in disengaged positions. The first and second biasing members are compressible to position the first and second pawls in engaged positions. The first and second pawls are pivotable about the pivoting portions relative to the rotor and the engaging portions of the first and second pawls are configured and arranged to engage a stop member when the first and second pawls are in engaged positions.

BRIEF DESCRIPTION OF THE DRAWINGS

The present invention can be more easily understood, and further advantages and uses thereof can be more readily apparent, when considered in view of the detailed description and the following Figures in which:

FIG. 2 is a front, partial cross section view of the self-retracting lifeline shown in FIG. 1 to show a centrifugal brake assembly;

FIG. 3 is a front, partial cross section view of the self-retracting lifeline shown in FIG. 1 to show a pawl of the centrifugal brake assembly shown in FIG. 2 in an engaged position.

In accordance with common practice, the various described features are not drawn to scale but are drawn to emphasize specific features relevant to the present invention. Reference characters denote like elements throughout the Figures and the text.

DETAILED DESCRIPTION OF THE INVENTION

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Figure 1:
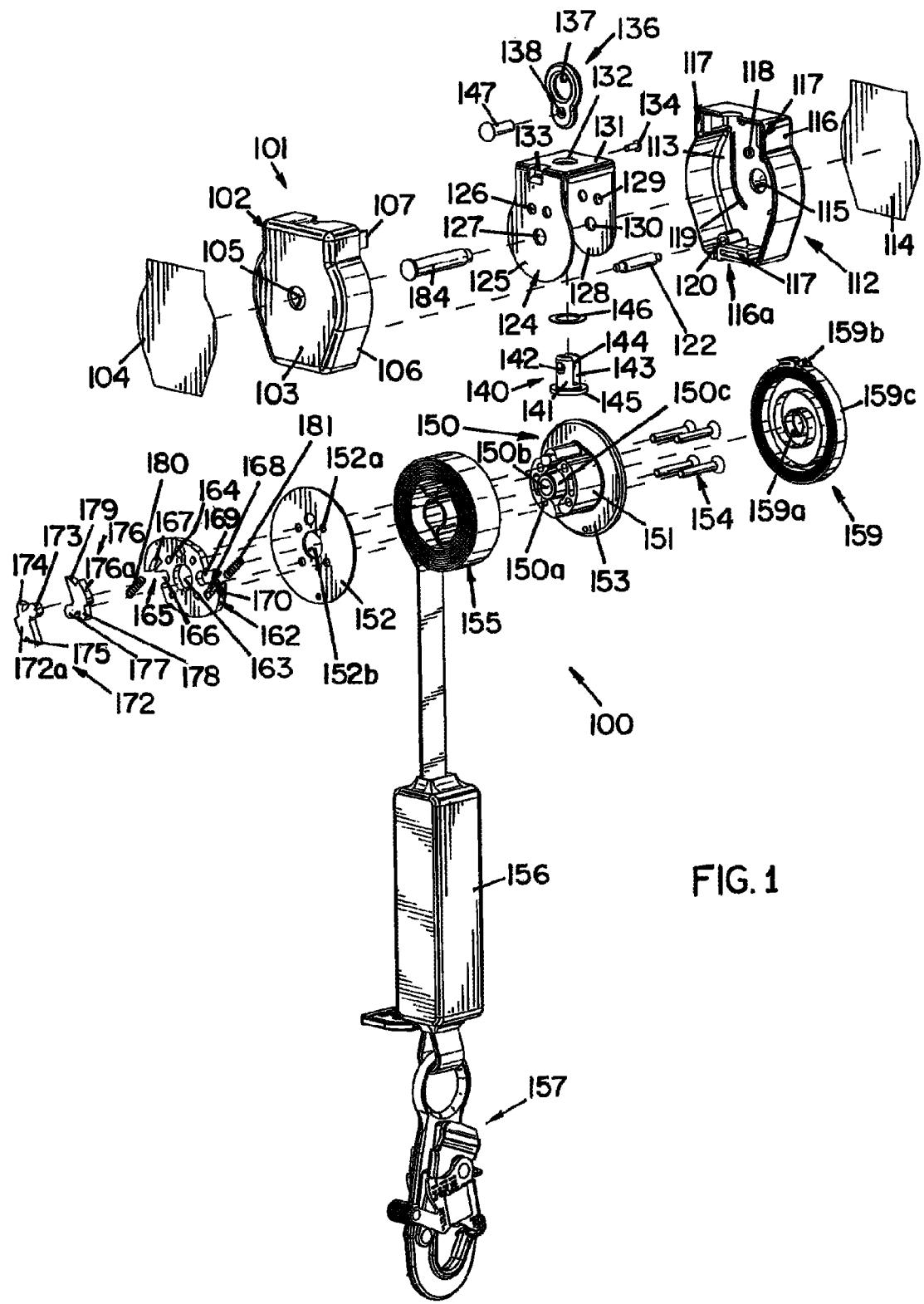
FIG. 1 is an exploded perspective view of a self-retracting lifeline constructed in accordance with the principles of the present invention.

As shown in FIGS. 1, 2, and 3, an embodiment self-retracting lifeline 100 includes a housing 101, which includes a first portion 102 and a second portion 112 that define a cavity 121 therebetween. The first portion 102 includes a plate portion 103 with an aperture 105 proximate the center and sides 106 extending approximately perpendicularly outward from the edges of the plate portion 103. A cover 104, which could be a product label including a variety of information, is configured and arranged to be operatively connected to the plate portion 103 and cover the aperture 105. The top right and left corners and the center of the bottom include protrusions 107 extending outward from the plate portion 103 parallel with the direction the sides 106 extend. The protrusions 107 include hook-like portions (not shown) proximate the distal ends. Proximate one side of the protrusion 107 located proximate the center of the bottom, the side 106 includes a slot (not shown) and a cylindrical portion 110 is proximate the protrusion 107 and the slot.

The second portion 112 includes a plate portion 113 with an aperture 115 proximate the center and sides 116 extending approximately perpendicularly outward from the edges of the plate portion 113. A cover 114, which could be a product label including a variety of information, is configured and arranged to be operatively connected to the plate portion 113 and cover the aperture 115. The top right and left corners and the center of the bottom include receiving members 117 that are configured and arranged to receive the protrusions 107 from the first portion 102, and the hook-like portions proximate the distal ends of the protrusions 107 engage the receiving members 117 proximate the plate portion 113. As shown in FIG. 1, proximate one side of the receiving member 117 located proximate the center of the bottom, the side 116 includes a slot 116a and a cylindrical portion 120 is proximate the receiving member 117 and the slot 116a. The inner surface of the plate portion 113 includes cylindrical portions 118 proximate the top of the aperture 115 and flanges 119 proximate the sides of the aperture 115. Although not shown, the first portion 102 includes similar cylindrical portions and flanges. The cylindrical portion 120 corresponds with the cylindrical portion of the first portion 102, and each end of a roller 122 is received by these cylindrical portions.

A bracket 124 is generally upside down U-shaped and includes top 131 interconnecting a first side 125 and a second side 128. It is recognized that any suitable bracket member could be used. The first side 125 includes an aperture 127 proximate the center and apertures 126 positioned above the aperture 127. The second side 128 includes an aperture 130 proximate the center and apertures 129 positioned above the aperture 130. The apertures 127 and 130 correspond, and the apertures 126 and 129 correspond. The top 131 includes an aperture 132 proximate the center. Proximate the juncture of the first side 125 and the top 131, two generally parallel slots are cut that extend from the first side 125 to the top 131 and the portion between the two slots is bent inward to form a stop member 133. The stop member 133 preferably forms a generally ninety degree angle. Because both ends of the stop member 133 remain connected to the bracket 124, the stop member 133 is much stronger than if it were formed by a U-shaped slot or cut only connected at one end. Thus, the stop member 133 is reinforced and is less likely to distort when it is engaged by one of the pawls. It is recognized that the stop member could also be a separate piece of material operatively connected to the bracket 124.

An anchor member 136 generally forms two ring portions with a first aperture 137, which is larger, proximate the top and a second aperture 138, which is smaller, proximate the bottom. A connector 140 is configured and arranged to extend through the aperture 132 in the top 131 of the bracket 124 and connect the anchor member 136 to the bracket 124. The connector 140 is generally U-shaped and includes a bottom portion 145 interconnecting a first side 141 and a second side 143. The first side 141 includes an aperture 142 proximate its distal end, and the second side 143 includes a corresponding aperture 144 proximate its distal end. The bottom portion 145 is generally disk shaped. A washer 146 is preferably positioned between the bottom portion 145 and the bracket 124, and the first and second sides 141 and 143 extend though the aperture 132 of the bracket's top 131. The bottom portion of the anchor member 136 is positioned between the first and second sides 141 and 143 so that the aperture 138 aligns with the apertures 142 and 144, and a fastener 147 extends through the apertures 142, 138, and 144. The anchor member 136 extends outwardly from the top of the housing 101, and the first aperture 137 enables the self-retracting lifeline 100 to be connected to a support structure (not shown) by a hook (not shown) or other suitable fastener well known in the art.

A drum 150, which resembles a spool when assembled, includes a base 151 and plate members that are a first side 152 and a second side 153 operatively connected to opposing sides of the base 151. Preferably, the second side 153 is integral with the base 151, as shown in FIG. 1, but it is recognized that the second side 153 could be a separate component similar to the first side 152. The base 151 includes a cylindrical portion 150c extending outward therefrom with a bore 150b and preferably four smaller bores 150a positioned about the cylindrical portion 150c extending longitudinally through the base 151 and the second side 153 proximate the center. The first side 152 includes an aperture 152b configured and arranged to receive the cylindrical portion 150c and four apertures 152a corresponding with the bores 150a. A biasing member 159, such as a motor spring, includes an inner end 159a and an outer end 159b. A housing 159c is configured and arranged to receive the biasing member 159 proximate one side of the biasing member 159. The housing 159c generally includes a circular plate member with a side extending outward therefrom to form a cavity in which the biasing member 159 is received. The side includes a slot through which the outer end 159b extends. The inner end 159a is operatively connected to the second side 153 by means well known in the art and the housing 159c is operatively connected to the bracket 124 by a rivet 134 or other means well known in the art. Because the outer end 159b is operatively connected to the housing 159c, which is operatively connected to the bracket 124, the outer end 159b is operatively connected to the bracket 124 and is held in a generally stationary position relative to the bracket 124.

A lifeline 155 includes a first end, a second end, and an intermediate portion therebetween. Although the preferred embodiment utilizes webbing, it is recognized that cable, rope, or another suitable elongate member may be used as the lifeline. The first end of the lifeline 155 is fixedly operatively connected by means well known in the art to the base 151. The intermediate portion is wound onto and off of the base 151 of the drum 150, and the sides 152 and 153 of the drum 150 keep the lifeline on the base 151. The second end of the lifeline 155 extends through the housing 101 and is operatively connected to a fastening device such as a snap hook 157. The lifeline 155 could also include a shock absorber 156 proximate the snap hook 157.

A centrifugal brake assembly includes a rotor 162, pawls 172 and 176, and springs 180 and 181. The rotor 162 is generally an oval-shaped disk or plate including two opposing receiving portions. The first receiving portion 165 includes a notched portion 166, which includes a semi-circular portion, and a slotted portion 167. The second receiving portion 168 includes a notched portion 169, which includes a semi-circular portion, and a slotted portion 170. An aperture 163 proximate the center of the rotor 162 is in alignment with aperture 152b of the first side 152 and is also configured and arranged to receive the cylindrical portion 150c. Apertures 164 are arranged about aperture 163 in alignment with apertures 152a and bores 150a. The aperture 163 and the apertures 164 are arranged in a central, generally circular portion of the rotor 162. The receiving portions 165 and 168 extend outward from the central portion of the rotor 162 to form the generally oval-shaped disk.

The first pawl 172 includes a circular portion 173, a protrusion 174, and a triangular protrusion 175a all protruding outwardly from a generally rectangular base portion 172a. The circular portion 173 protrudes outwardly proximate a first corner of the base portion 172a. The protrusion 174 protrudes outwardly proximate a middle of one side proximate the circular portion 173. A notched portion 175 is formed by the base portion 172a and the triangular protrusion 175a, which extends outwardly proximate a second corner adjacent the circular portion 173 and proximate a side opposite the protrusion 174.

The first receiving portion 165 of the rotor 162 is configured and arranged to receive the first pawl 172 and a first spring 180. The notched portion 166 receives the circular portion 173 and the slotted portion 167 receives the first spring 180 and the protrusion 174. The notched portion 166 is configured and arranged to allow the first pawl 172 to pivot about the circular portion 173. It is recognized that the slotted portion of the rotor and the protrusion of the pawl could be reversed so that the pawl includes a slotted portion configured and arranged to receive the first spring and the protrusion of the rotor.

The second pawl 176 includes a circular portion 177, a protrusion 178, and a triangular protrusion 179a all protruding outwardly from a generally rectangular base portion 176a. The circular portion 177 protrudes outwardly proximate a first corner of the base portion 176a. The protrusion 178 protrudes outwardly proximate a middle of one side proximate the circular portion 177. A notched portion 179 is formed by the base portion 176a and the triangular protrusion 179a, which extends outwardly proximate a second corner adjacent the circular portion 177 and proximate a side opposite the protrusion 178.

The second receiving portion 168 of the rotor 162 is configured and arranged to receive the second pawl 176 and a second spring 181. The notched portion 169 receives the circular portion 177 and the slotted portion 170 receives the second spring 181 and the protrusion 178. The notched portion 169 is configured and arranged to allow the second pawl 176 to pivot about the circular portion 177. It is recognized that the slotted portion of the rotor and the protrusion of the pawl could be reversed so that the pawl includes a slotted portion configured and arranged to receive the first spring and the protrusion of the rotor.

To assemble the self-retracting lifeline, the lifeline 155 is operatively connected to the base 151 of the drum and the aperture 152b of the first side 152 receives the cylindrical portion 150c. The apertures 152a of the first side 152 correspond with the bores 150a of the drum 150. The rotor 162 includes the aperture 163 configured and arranged to receive the cylindrical portion 150c and four apertures 164 corresponding with apertures 152a and bores 150a. The bores 150a, the apertures 152a, and the apertures 164 are spaced approximately evenly about the bore 150b of the drum 150, the aperture 152b of the rotor 162, and the aperture 163 of the rotor, respectively, and are configured and arranged to receive fasteners 154. The pawls 172 and 176 and the springs 180 and 181 are positioned in the respective receiving portions 165 and 168. The drum 150, the lifeline 155, the motor spring 159, and the centrifugal brake assembly are configured and arranged to fit between the first and second sides 125 and 128 of the bracket 124 so that the bore 150b corresponds with the apertures 127 and 130. The anchor member 136 is operatively connected to the bracket 124 as previously described. The pawls 172 and 176 are positioned proximate the first side 125. An axle 184 is inserted through the aperture 127, the bore 150b, and the aperture 130 to connect these components.

The bracket 124 along with the components therein and the roller 122 are then positioned between the first portion 102 and the second portion 112 of the housing 101. The apertures 126 of the first side 125 are configured and arranged to receive the cylindrical portions (not shown) of the first portion 102, and the apertures 129 of the second side 128 are configured and arranged to receive the cylindrical portions 118 of the second portion 112. The receiving members 117 of the second portion 112 receive the protrusions 107 of the first portion 102, and the hook-line portions at the distal ends of the protrusions 107 engage the receiving members 117 to operatively connected the first and second portions 102 and 112 of the housing 101. The apertures 127 and 130 of the bracket's first and second sides 125 and 128 and the bore 150b of the drum 150 align with the apertures 105 and 115 of the housing's first and second portions 102 and 112, and an axle 184 is configured and arranged to extend therethrough so that the drum 150 is rotatably operatively connected to the bracket 124 and the housing 101. The motor spring 159, which is operatively connected to the drum 150 and the bracket member 124 as previously described, places a biasing force on the drum 150 so that the lifeline 155 is wound about the drum 150 when tension on the lifeline 155 is released. The lifeline 155 extends through the slots in the first and second portions 102 and 112 and the roller 122 assists in reducing wear on the lifeline 155 as it is paid out of and retracted into the housing 101.

The pawls 172 and 176 and the springs 180 and 181 are held into place by the first side 152 of the drum 150, the rotor 162, and the first side 125 of the bracket 124. In other words, the notched portions 166 and 169, the slotted portions 167 and 170, the first side 152 of the drum 150, and the first side 125 of the bracket 124 form cavities or areas of confinement within which the pawls 172 and 176 and the springs 180 and 181 are arranged.

In operation, the housing 101 of the self-retracting lifeline 100 is operatively connected to a support structure via the anchor member 136, and the lifeline 155 is operatively connected to a safety harness worn by a worker via the snap hook 157. The worker is free to move about the vicinity of the self-retracting lifeline 100, with only the length of the lifeline 155 restricting the distance of the worker's movement. As the worker moves further away from the self-retracting lifeline 100, lifeline 155 is paid out of the housing 101 as it is unwound from the drum 150. As the worker moves closer to the self-retracting lifeline 100, lifeline 155 is retracted into the housing 101 as it is wound about the drum 150 due to the biasing force exerted upon the drum 150 by the motor spring 159.

In the event a fall should occur, the sudden acceleration or high rate of speed at which the drum 150 turns to pay out lifeline 155 causes the pawls 172 and 176 to overcome the force of the springs 180 and 181. The centrifugal force causes the pawls 172 and 176 to pivot about the circular portions 173 and 177 and the protrusions 174 and 178 compress the springs 180 and 181. As the drum 150 rotates and the pawls 172 and 176 move from a disengaged position 190 into an engaged position 191, one of the pawls 172 and 176 will engage the stop member 133 of the bracket 124. The notched portions 175 and 179 of the pawls 172 and 176 are configured and arranged to engage the stop member 133. In addition, the protrusions 174 and 178 are positioned within the slotted portions 167 and 170 and the bases 172a and 176a of the pawls 172 and 176 contact the rotor 162, which strengthens the pawl that engages the stop member 133. The first and second pawls 172 and 176 are each shown in a disengaged position 190 in FIG. 2, and the second pawl 176 is shown in an engaged position 191 in FIG. 3. When the lifeline 155 unwinds from the drum 150 at a rotational velocity greater than a predetermined maximum rotational velocity, both pawls 172 and 176 pivot to the engaged positions. After the fall is arrested, the pawl that is not engaging the stop member 133 will return to the disengaged position due to the biasing force of the biasing member 159. Engagement of the stop member 133 by one of the pawls 172 and 176 stops rotation of the drum 150 and thus stops additional lifeline 155 from being paid out of the housing 101. Once one of the pawls 172 and 176 has engaged the stop member 133, it cannot be disengaged until the drum 150 begins to rotate backward to rewind the lifeline 155 onto the drum 150. The shock absorber 156 is used to absorb energy and reduce the amount of force exerted upon the worker from the fall.

During use, but not during a fall, the first spring 180 places a biasing force on the first pawl 172 so that the triangular protrusion 175a contacts the rotor 162 and the second spring 181 places a biasing force on the second pawl 176 so that the triangular protrusion 179a contacts the rotor 162. During a fall or when the drum 150 rotates at a predetermined speed, the biasing forces of the first and second springs 180 and 181 are overcome, the first and second pawls 172 and 176 pivot toward the respective slotted portions 167 and 170, and the protrusions 174 and 178 compress the respective first and second springs 180 and 181.

One of the advantages of the present invention is the ease of manufacture and assembly of the self-retracting lifeline 100. In prior art self-retracting lifelines, the pawls include pins about which the pawls pivot and the pawls are fixedly attached to the springs, which are fixedly attached to another component. The present invention does not include pins on the pawls or fixedly attach the springs to any component. The pawls 172 and 176 and the springs 180 and 181 are simply placed within the appropriate spaces or cavities formed by the first side 152 of the drum 150, the rotor 162, and the first side 125 of the bracket 124.

The first side 152 of the drum 150, the rotor 162, and the first side 125 of the bracket 124 form an enclosure that defines boundaries of a confinement cavity, wherein the pawls 172 and 176 and the springs 180 and 181 are held in place from movement in a first direction by a front stop (first side 125) and a back stop (first side 152). The pawls 172 and 176 are held in place from movement in a second direction generally perpendicular to the first direction by the rotor 162. The springs 180 and 181 are held in place from movement in the second direction by the rotor 162 and the respective protrusions 174 and 178 of the pawls 172 and 176. The pawls 172 and 176 and the springs 180 and 181 are held in place by the boundaries of the confinement cavity. Therefore, the pawls 172 and 176 and the springs 180 and 181 do not require any interconnections such as pins or other fixed attachments well known in the art.

Figure 4:
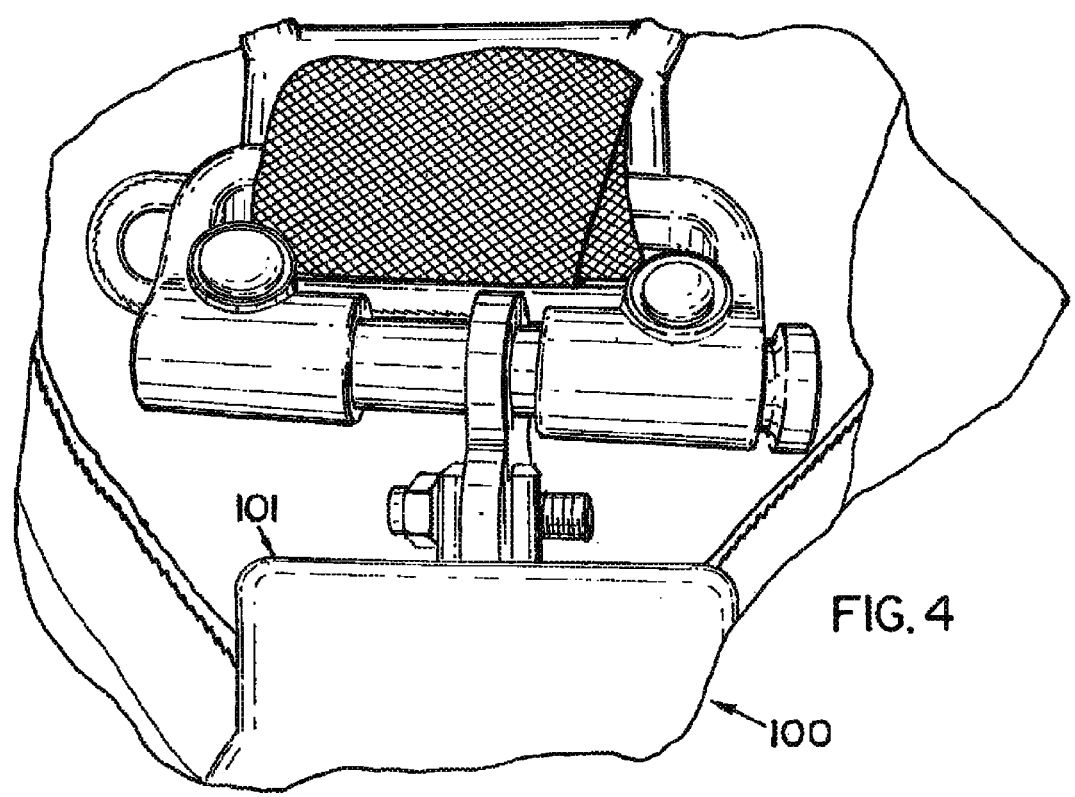
FIG. 4 shows a self-retracting lifeline constructed in accordance with the principles of the present invention operatively connected to a safety harness.

FIG. 4 shows the self-retracting lifeline 100 operatively connected to a harness by means well known in the art.

It is recognized that the centrifugal brake assembly, including the rotor 162, the pawls 172 and 176, and the springs 180 and 181, of the present invention is not limited to use with the preferred embodiment self-retracting lifeline 100 and may be used with any other suitable self-retracting lifeline or controlled descent device well known in the art.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. A centrifugal brake assembly, comprising:
   at least one pawl including a base from which a circular portion and a triangular protrusion extend, the base and the triangular protrusion form a notch;
   at least one biasing member;
   a rotor including at least one receiving portion having a notched portion being configured and arranged to receive the circular portion;
   one of the at least one pawl and the rotor having a curved slotted portion, the at least one biasing member being seated within the curved slotted portion, another of the at least one pawl and the rotor having a curved protrusion at least partially extending within the curved slotted portion in line with the curved slotted portion and the at least one biasing member; and
   wherein the at least one pawl is pivotable about the circular portion relative to the rotor, and the notch of the at least one pawl engages a stop member and the base contacts the rotor when the at least one pawl is in an engaged position to reinforce engagement of the stop member by the at least one pawl.

2. The centrifugal brake assembly of claim 1, wherein the at least one biasing member biases the at least one pawl in a disengaged position and the at least one pawl compresses the at least one biasing member and moves into the engaged position when the rotor exceeds a predetermined maximum rotational velocity.

3. The centrifugal brake assembly of claim 1, wherein the at least one pawl includes the curved elongated protrusion and the rotor includes the curved slotted portion.

4. The centrifugal brake assembly of claim 1, wherein the base of the at least one pawl is generally rectangular, the circular portion protrudes outwardly proximate a first corner of the base portion, and the triangular protrusion extends outwardly proximate a second corner adjacent the circular portion.

5. The centrifugal brake assembly of claim 1, wherein the notched portion of the rotor includes a semi-circular portion.

6. The centrifugal brake assembly of claim 1, wherein the rotor includes opposing first and second receiving portions and each of the first and second receiving portions is configured and arranged to receive the circular portion of a respective pawl.

7. A centrifugal brake assembly, comprising:
first and second pawls, each of the first and second pawls including a base from which a pivoting portion and an engaging portion extend;
first and second biasing members;
a rotor including first and second receiving portions configured and arranged to receive respective pivoting portions;
one of the first and second pawls and the rotor having first and second curved slotted portions, the first and second biasing members being seated within the respective first and second curved slotted portions, another of the first and second pawls and the rotor having first and second curved elongated protrusions at least partially extending within the respective first and second curved slotted portions and in line with the respective first and second curved slotted portions and first and second biasing members, the first and second biasing members being positioned between respective surfaces forming ends of the first and second curved slotted portions and the first and second curved elongated protrusions and placing biasing forces on the first and second pawls to position the first and second pawls in disengaged positions, the first and second biasing members being compressible to position the first and second pawls in engaged positions; and
wherein the first and second pawls are pivotable about the pivoting portions relative to the rotor and the engaging portions of the first and second pawls are configured and arranged to engage a stop member when the first and second pawls are in engaged positions.

8. The centrifugal brake assembly of claim 7, wherein the first and second receiving portions each include a notched portion configured and arranged to receive the respective pivoting portions, the pivoting portions are generally circular in shape, the engaging portions are generally triangular in shape, and the notched portions each include a generally semi-circular portion.

9. The centrifugal brake assembly of claim 8, wherein the base of each of the first and second pawls is generally rectangular, the pivoting portion of each of the first and second pawls protrudes outwardly proximate a first corner of the base, and the engaging portion of each of the first and second pawls extends outwardly proximate a second corner adjacent the respective pivoting portion.

10. The centrifugal brake assembly of claim 7, wherein the first and second pawls include respective first and second curved elongated protrusions and the rotor includes the first and second curved slotted portions.

11. The centrifugal brake assembly of claim 7, wherein the rotor includes opposing first and second receiving portions and each of the first and second receiving portions is configured and arranged to receive respective pivoting portions of the first and second pawls.

12. The centrifugal brake assembly of claim 7, wherein each base contacts the rotor in the engaged position to reinforce engagement of the stop member by the respective first and second pawls.

* * * * *